Figure 1:
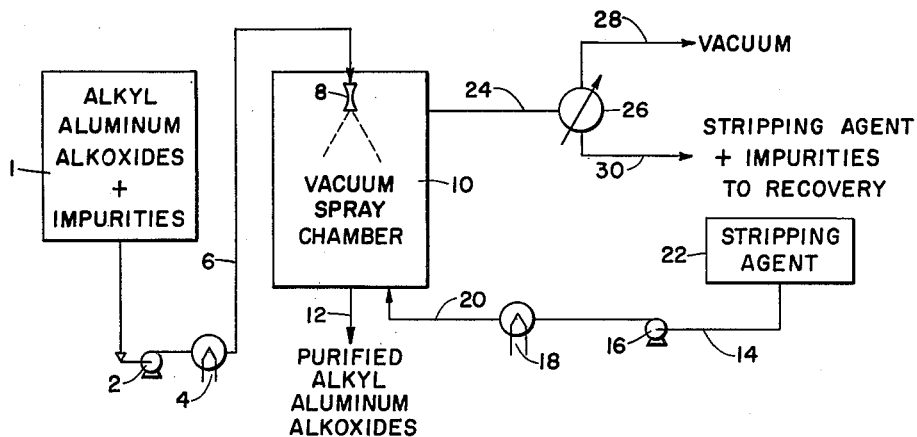

Sept. 17, 1963

C. V. FOSTER ETAL 3,104,251

PURIFICATION OF ORGANO-ALUMINUM
COMPOUNDS BY SPRAY STRIPPING

Filed July 7, 1960

2 Sheets-Sheet 1

INVENTOR.
CHARLES VERNON FOSTER
JERRY A. ACCIARRI
BY

ATTORNEY

INVENTOR.
CHARLES VERNON FOSTER
JERRY A. ACCIARRI
BY
ATTORNEY

PURIFICATION OF ORGANO-ALUMINUM COMPOUNDS BY SPRAY STRIPPING

Charles Vernon Foster, Needham Heights, Mass., and Jerry A. Acciarri, Ponca City, Okla., assignors to Continental Oil Company, Ponca City, Okla., a corporation of Delaware
Filed July 7, 1960, Ser. No. 41,399
9 Claims. (Cl. 260—448)

This invention relates to a process for the purification of aluminum containing organic compounds and more particularly to a process for the purification of such compounds contaminated with nonaluminum containing organic compounds.

Organic compounds containing aluminum of which the trialkylaluminum compounds are prime examples have become very important commercially. To mention only a few of their many uses, trialkylaluminum compounds are useful in the preparation of aliphatic alcohols and alpha-olefins. Since the methods for preparing trialkylaluminum compounds are well known, those methods will not be described here other than to refer to U.S. Patents 2,781,419; 2,787,626; 2,826,598; 2,835,689; and British Patent 808,055 which disclose a few of the methods for preparing these compounds.

It has been proposed that aliphatic alcohols can be produced by partially oxidizing the trialkylaluminum compound to an aluminum alkoxide followed by hydrolysis of the alkoxide to the corresponding alcohol. These reactions can be illustrated equationwise as follows:

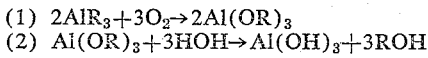

(1) $2AlR_3 + 3O_2 \rightarrow 2Al(OR)_3$
(2) $Al(OR)_3 + 3HOH \rightarrow Al(OH)_3 + 3ROH$ The partial oxidation of the trialkylaluminum compound to the aluminum alkoxide is not as simple as Equation 1 indicates. In addition to the production of the desired alkoxide, a portion of the trialkylaluminum compounds will not be oxidized that far and some will not be oxidized at all. If an attempt is made to oxidize all of the trialkylaluminum compounds to the alkoxide, some will be oxidized beyond the desired stage. Furthermore since the original trialkylaluminum compounds generally are produced from petroleum products, certain other contaminants, such as hydrocarbons, nitrogen, and sulfur-containing organic compounds will be present also. If an aluminum alkoxide mixture containing any or all of the contaminants listed above is hydrolyzed, an aliphatic alcohol will be produced; however it will be contaminated with the same impurities as contained in the original mixture. This is highly objectionable, because the recovery of the alcohol from such a mixture by distillation is exceedingly difficult if not impossible.

It is therefore a principal object of the present invention to provide a process for the separation of the components of a liquid mixture of organic compounds.

It is another object of our invention to provide a process for the separation of aluminum containing organic compounds from nonaluminum containing organic compounds.

These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects and advantages are attained by a process which may be described broadly as follows: A mixture consisting of an organic compound which may include a trialkylaluminum compound, oxidation products of the same, and mixtures thereof contaminated with other organic compounds the molecular structures of which do not include aluminum is heated, atomized, and then contacted with a stripping agent, also heated to an elevated temperature. Two phases are formed, a vapor phase comprising the solvent and impurities and a liquid phase comprising the first-mentioned organic compound substantially free of impurities and the stripping agent. The two phases are separated after which the various components in each phase can be individually separated by fractional distillation.

The invention will now be described in conjunction with the accompanying drawings in which FIGURES 1 to 4 illustrate schematically four different embodiments of our invention.

Referring to the drawings in detail and to FIGURE 1 in particular, an aluminum alkoxide mixture from the oxidation section containing impurities but stripped of solvent is passed from vessel 1 through pump 2 and heat exchanger 4 whereby the temperature of the stream 6 is increased to a predetermined value. These alkoxides are sprayed through a pressure nozzle 8 into a vacuum chamber 10. Liquid suitable for stripping purposes is passed from storage 22 through conduit 14, pump 16, and heat exchanger 18 whereby the liquid is vaporized and the temperature of stream 20 is increased to the same value as stream 6. The stripping vapor 20 is passed countercurrently to the falling alkoxide spray in chamber 10. The stripping vapor plus impurities 24 are condensed in exchanger 26 under vacuum 28 and sent to the recovery section through conduit 30. The purified aluminum alkoxides 12 are collected and withdrawn from the spray chamber and sent to the hydrolysis section.

Figure 2:
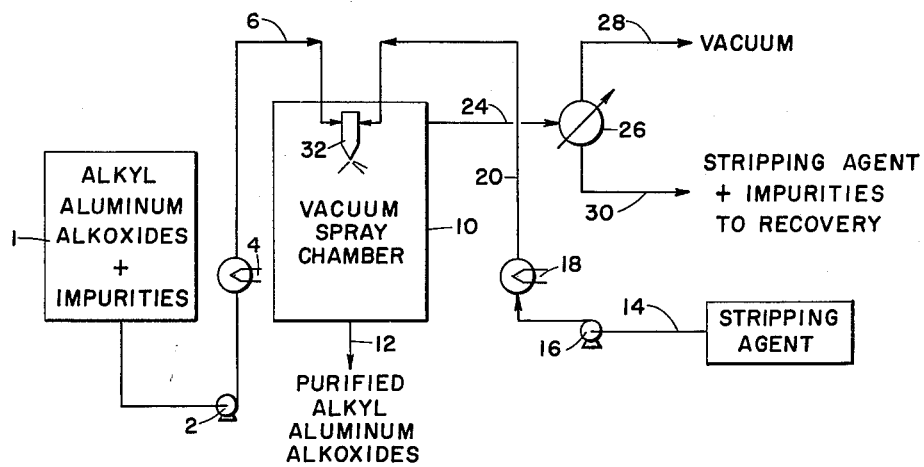

In FIGURE 2, an aluminum alkoxide mixture from the oxidation section containing impurities but stripped of solvent is passed from vessel 1 through pump 2 and heat exchanger 4 whereby the temperature of stream 6 is increased to a predetermined value. These alkoxides are sprayed through a pneumatic nozzle 32 into chamber 10 whereby the alkoxides are atomized by a stripping agent 20 at nearly the same temperature as the alkoxides. The stripping agent plus impurities 24 are condensed in exchanger 26 and sent to the recovery section. The purified aluminum alkoxides are collected and withdrawn from the spray chamber through conduit 12 and sent to the hydrolysis section.

Figure 3:
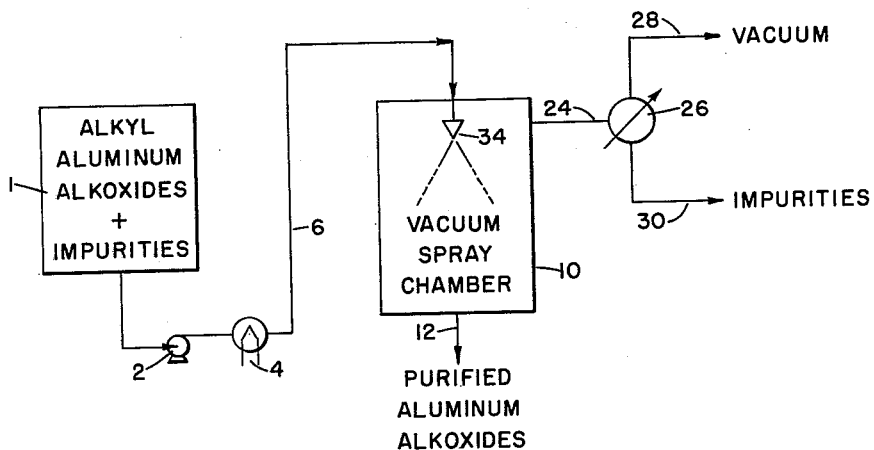

In FIGURE 3 an aluminum alkoxide mixture from the oxidation section containing impurities but free of solvent is pumped through heat exchanger 4 whereby the temperature of stream 6 is increased to a predetermined value. These alkoxides are sprayed through a pressure nozzle 8 into chamber 10 whereby the impurities vaporize, are condensed 26, and discarded 30. The purified aluminum alkoxides are collected and withdrawn from the spray chamber through conduit 12 and sent to the hydrolysis section.

Figure 4:
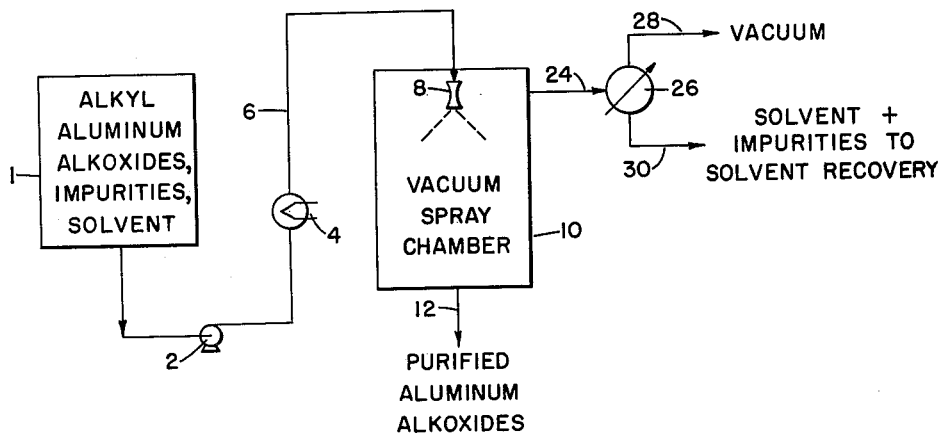

In FIGURE 4, an aluminum alkoxide mixture from the oxidation section containing impurities and the solvent is pumped through heat exchanger 4 whereby the temperature of stream 6 is increased to a predetermined value. This stream is then sprayed into chamber 10 through pressure nozzle 8 whereby the solvent and impurities are vaporized, condensed 26, and sent to the solvent recovery section 30. The purified aluminum alkoxides are collected and withdrawn from the spray chamber and sent to the hydrolysis section.

Before proceeding with specific examples illustrating our invention, it may be well to indicate in general the nature of the materials present in the process.

Suitable trialkylaluminum compounds include such compounds wherein the carbon content of the alkyl radicals varies from 1 to 20 or even more. Although theoretically there is no limit to the number of carbons in the alkyl radical that can be used, we generally prefer to employ a trialkylaluminum compound wherein the carbon content of alkyl radicals varies from 2 to 20. Obviously the alkyl radicals of the trialkylaluminum compound can be the same or different. As a rule, a compound wherein the alkyl radicals are the same is desired as the use of such a compound produces one alcohol. If on the other hand a compound is used wherein the alkyl radicals are different, a mixture of alcohols is formed.

One method for the preparation of the aluminum alkoxides used in our process can be described briefly as follows: The trialkylaluminum compounds in a solvent are charged to a four-compartment agitated tower with a capacity of approximately 20 gallons. Air, or other free oxygen carrier, is fed continuously into the bottom of the reactor. The operating conditions may be any combination of the variables listed below:

Pressure range _____ p.s.i.g__ 0–80
Temperature range _____ °F__ 70–120
Air rate range _____ s.c.f.h__ 148–272
Agitator speed range _____ r.p.m__ 200–440

The reaction time is dependent upon the particular combination of variables used.

As pointed out above, the oxidized mixture will comprise oxidized and unoxidized trialkylaluminum compounds, alkanes, alkenes, various aliphatic acids, alcohols, aldehydes, esters, and ketones, solvent used in the growth reaction, and sulfur containing organic compounds. Typical solvents used in the growth reaction including iso-octane, nonane, undecane, sweetened kerosene, and others.

Suitable temperature and pressure ranges over which the process is operated can be varied greatly as will be apparent from the following discussion. The temperature to which the mixture is heated before the spraying process is a function of the "M" value of the oxidized growth product, the growth solvent used, the system pressure, the number of stripping stages, and the amount of stripping agent used. A purification at atmospheric pressure, therefore, requires a higher temperature than a similar procedure under vacuum. The same type of statements can be made for various combinations of the above-mentioned points.

The temperature we have used is approximately midway between the most and least volatile impurities. The vaporization of the impurities out of the oxidized aluminum alkyls is dependent not only on the temperature and pressure of the system and on the amount of stripping agent used, but also on the increased vapor pressure of droplets due to their small spherical size caused by atomization. The ranges of the above-mentioned variables we have used are listed below:

(a) "M" value of oxidized growth product: 3.0–6.0
(b) Growth solvent: iso-octane (most volatile), sweetened kerosene (least volatile)
(c) System pressure: 5–760 mm. Hg absolute
(d) System temperature: 350–550° F.
(e) Number of stripping stages: 1–4
(f) Amount of stripping agent used: none–20 lb. mole solvent per 1,000 lb. feed Suitable stripping agents include: n-hexane, isooctane, toluene-xylene mixture, Soltrol 130 solvent, sweetened kerosene, natural gas, and others.

It is immaterial whether or not the stripping agent is a condensable (such as hexane) or a noncondensable product (such as natural gas). The amount of stripping agent used is dependent upon other operating conditions. It also makes no difference if the stripping agent is introduced into the stripping chamber countercurrently or co-currently to the atomized liquid flow. In the latter case, the stripping agent would be introduced with the feed through a pneumatic nozzle. With a proper choice of conditions, no stripping agent is necessary for this purification procedure.

In order to disclose the nature of the present invention still more clearly, the following illustrative examples will be given. It is to be understood that the invention is not to be limited to the specific conditions or details set forth in these examples except insofar as such limitations are specified in the appended claims.

Following the procedure as outlined, our experiments together with the results are summarized below:

EXAMPLE 1

| "M" Value[1] of Oxidized Growth Product | Growth Solvent | Weight Percent in Oxidized Growth Product | | Stripping Stage No. | Nozzle Type | Nozzle Feed Temp., °F. | System Nozzle | | Stripping Agent | |
|---|---|---|---|---|---|---|---|---|---|---|
| | | Growth Solvent | Impurities | | | | Mm. Hg | P.s.i.g. | Type | Amount Lb. Mole Per 1,000 Lb. Feed |
| 3.83 | Soltrol 130 | 18.21 | 17.09 | 1 | Binks 12–25 Hollow Cone[2] | 450 | 760 | 152 | None | 0.00 |
| | | | | 2 | | 450 | 100 | 102 | Hexane | 4.19 |
| | | | | 3 | | 450 | 100 | 135 | ___do___ | 4.31 |

EXAMPLE 2

| 4.40 | Sweet Kerosene | 18.77 | 12.61 | 1 | Spraying System ⅛ GI Solid Cone.[3] | 450 | 760 | 128 | None | 0.00 |
| | | | | 2 | | 450 | 100 | 110 | Iso-octane | 2.08 |
| | | | | 3 | | 450 | 100 | 90 | ___do___ | 2.06 |

EXAMPLE 3

| 4.20 | Sweet Kerosene | 20.18 | 8.83 | 1 | (Same as in Example 2) | 450 | 100 | 118 | None | 0.00 |
| | | | | 2 | | 450 | 100 | 82 | Natural Gas | 1.55 |

EXAMPLE 4

| 4.18 | Sweet Kerosene | 20.18 | 9.99 | 1 | (Same as in Example 2) | 500 | 50 | 102 | None | 0.00 |
| | | | | 2 | | 500 | 50 | 70 | ___do___ | 0.00 |

[1] By "M" value is meant the average number of ethylene units reacted with triethylaluminum.
[2] Described in Binks Manufacturing Company Catalogue No. 5660 "Spray Nozzles," page 10. Type of nozzle disclosed in U.S. Patent No. 2,378,393.
[3] Described in Spraying Systems Company Catalogue No. 24 "Spraying Systems," page 10. Type of nozzle disclosed in U.S. Patent No. 2,305,210.

In all of the foregoing examples, the quantity of impurities in the final product was substantially zero.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having thus been described, what is claimed and desired to be secured by Letters Patent is:

1. A process for removing organic contaminants from a mixture of organo-aluminum compounds including an aluminum alkoxide which comprises heating said mixture to a temperature between about 350° F. and 550° F., atomizing the heated mixture, thereupon contacting same with a stripping agent heated to a temperature about that of said mixture and recovering said mixture as a liquid phase substantially free of said contaminants.

2. A process for removing organic contaminants from a mixture of organo-aluminum compounds including an aluminum alkoxide which comprises heating said mixture to a temperature between about 350° F. and 550° F., atomizing the heated mixture, introducing said atomized mixture into a vacuum chamber maintained at a pressure from about 5 to 760 mm. Hg, thereupon contacting said atomized mixture with a stripping agent heated to a temperature about that of said mixture and recovering said mixture as a liquid phase substantially free of said contaminants.

3. The process of claim 2 wherein the stripping agent is a hydrocarbon.

4. The process of claim 2 wherein the stripping agent is a noncondensable hydrocarbon.

5. The process of claim 2 wherein the stripping agent is a condensable hydrocarbon.

6. The process of claim 2 wherein the stripping agent is natural gas.

7. The process of claim 2 wherein the stripping agent is hexane.

8. The process of claim 2 wherein the stripping agent is iso-octane.

9. The process of claim 2 wherein the stripping agent is sweetened kerosene.

References Cited in the file of this patent

UNITED STATES PATENTS 2,892,858     Ziegler _____ June 30, 1959

OTHER REFERENCES

Brown et al.: Unit Operations (1950), pages 322–323.